Sept. 4, 1951            W. B. BOICE            2,566,551

BAND TOOL GUIDE

Original Filed Sept. 1, 1944

Inventor
William B. Boice
By *Geo E Kirk*
Attorney

Patented Sept. 4, 1951

2,566,551

UNITED STATES PATENT OFFICE 2,566,551

BAND TOOL GUIDE

William B. Boice, Toledo, Ohio, assignor to Boice-Crane Company, Toledo, Ohio, a corporation of Ohio Original application September 1, 1944, Serial No. 552,350, now Patent No. 2,431,605 dated November 25, 1947. Divided and this application October 20, 1947, Serial No. 780,795

1 Claim. (Cl. 29—76)

This invention relates to band types of power tools, including precision service and means to conform the tool to different conditions and requirements for efficient operation.

This invention has utility when incorporated in features of guiding and directing control for the band at the region the band tool is contacted by the work to be performed. The work on the table is directed against the band as the band travels thru the table. Adjusting means are duplicated above and below the table to provide identical positioning and positive guiding control for the band tool in its approach to the work and in its course therefrom.

Referring to the drawings.

Figure 1:
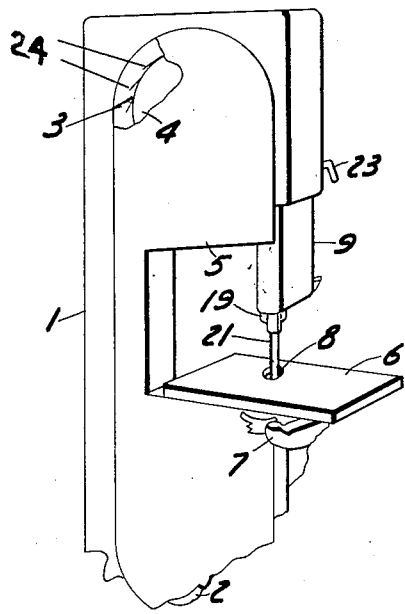
Fig. 1 is a fragmentary perspective view of an embodiment of the invention in an endless band type of power tool.

A machine frame 1 has therein a wheel 2 adapted to be actuated from a source of power. The wheel 2, in the lower portion of the frame 1, has a flexible band 3 therefrom extending upward to pass over an upper follower wheel 4. The wheel 4 is in the upper portion of the frame 1. Forwardly from the upper portion of the frame 1 is a front overhang 5 above a work table 6. An adjustable mounting connection 7, from the underside of the table 6, assembles the table 6 with the lower portion of the frame 1. Centrally on the table 6 at an opening thru the table is a slotted disk 8. The disk 8 is below a telescopic portion 9 which is adjustable relatively to the frame overhang 5. This adjustment of the portion 9 is toward and from the table 6.

Work region control

Figure 2:
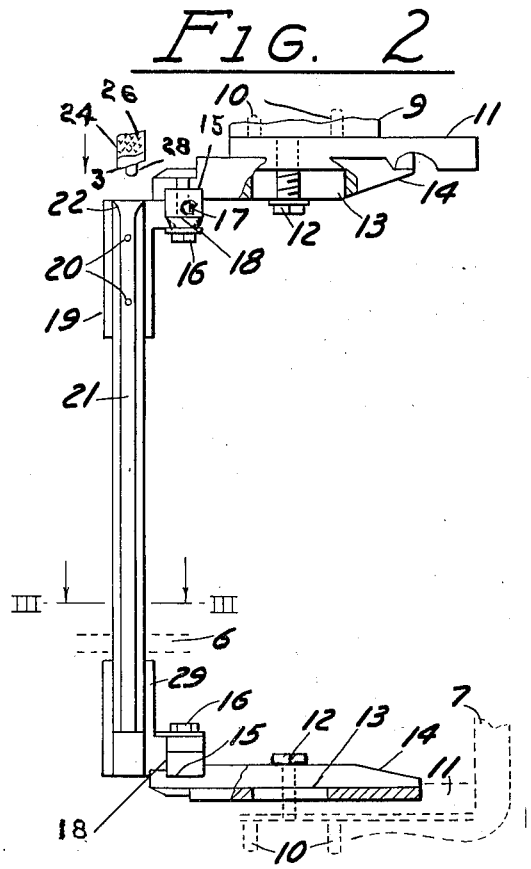
Fig. 2 is a front elevation of band guiding and control means at the region of the work, with portions of the adjustable mountings therefor removed, the scale being somewhat enlarged over the showing in Fig. 1.

From the upper wheel 4, the band 3 passes out of the overhang 5 thru the guide portion 9. A pair of bolts 10, from the guide 9 (Fig. 2), extend downward to mount a horizontally extending slide way or track 11. An upwardly extending bolt 12 is thru a slot 13 in a channel slide member 14. The bolt 12 engages the track 11, and as loosened, releases the member 14 to be slid on the track 11.

Figure 3:
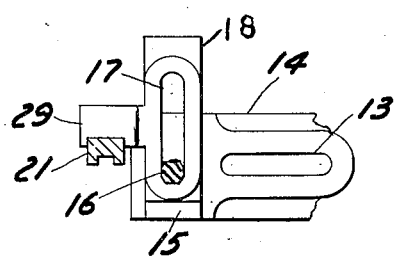
Fig. 3 is a view looking down from the line III—III, Fig. 2, showing a portion of the mounting for the band guiding and controlling means as beneath the work supporting table.

At the underside and crosswise of its forward end, the member 14 has a channel or slide way 15. A bolt 16 (Figs. 2, 3), in a slot 17 of a slide bracket 18, engages the way 15 and, as tightened, locks the bracket 18 therein. The slot 17 is at right angles to the slot 13 at these horizontally extending adjusting means or slides. The travel direction of the band 3 as to the table 6 is vertical.

To the left of the slide 18 (Fig. 2) there is therefrom a downwardly extending channel 19. Screws 20 anchor a vertically extending guide channel 21 to be seated in the channel 19 and project thru the work table 6. The upper or band entrance end of the guide 21 has a flare portion 22 adapted to direct the band 3 to ride centrally of the guide 21 in the downward course of the band 3 toward the table 6. The clearance, upward from the table 6 for the mounting and adjusting means for the guide 21, may be varied by sliding the portion 9 in and out as to the frame overhang 5. At the desired position for the portion 9, a clamp 23 (Fig. 1) may be operated to hold firmly the portion 9 in the frame overhang 5.

Figure 4:
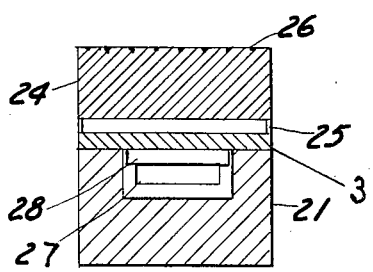
Fig. 4 is a section on an enlarged scale above the table thru the channel guide, band and a file element.

The guide 21 (Fig. 4) is of width approximating that of a file element 24, its liner 25 and the band 3. This means that work, moved directly against face 26 of the traveling element 24, does not directly contact the guide 21.

In some operations, the workman may progress the work sidewise during the engagement of the work with the file elements 24. Rivet ends 27 and plate 28 ride in the channel of the guide 21, and thereby provide lug means to restrain the band 3 from responding to any pressure tending to shift the band 3 out of its straight line travel direction as held by the guide 21.

From below the table 6, the table-mounting bracket 7 (Figs. 1, 2) has bolts 10 anchor a horizontally extending slide way or track 11. A downwardly extending bolt 12 is thru a slot 13 of a channel slide 14 astride the track 11. Upon loosening the bolt 12, the member or downwardly open channel 14 may be adjusted along the track 11 relatively to the bracket 7. The normal adjusted position for the end of the channel 14 as to the track 11, so positions the member 14 to have its upwardly open channel or guide way 15 directly crosswise from the direction of the track 11. A downwardly directed bolt 16 is thru a slot 17 of a secondary slide member 18. The bolt 16, as tightened, locks the member 18 to the primary slide member 14. Accordingly, as slackened, the bolt 16, may release the member 18 for a desired adjustment. The member 18, from below the table 6, instead of carrying the channel 19, has a reversal thereof in an upwardly directed channel portion 29.

The mounting from the bolts 10 at the portion 9 and from the bolts 10 from the brackets 7, are of identity in adjustment features for locating the channel 29 in alignment with the upper channel 19, so that the lower portion of the guide 21 may have telescopic fit in the channel 29 in response to up and down adjustment of the telescopic portion 9. The similar dual crosswise adjustments for the channels 19, 29, and the guide 21 directed thereby, may locate the downward travel reach of the endless band 3 in a disturbance minimizing relation as to the wheels 4, 2.

This case is a Division of this applicant's Patent 2,431,605, November 25, 1947, Endless Band Tool, filed September 1, 1944.

What is claimed and it is desired to secure by Letters Patent is:

A band tool having a frame, a table having an aperture and mounted on said frame, a band passing through said table aperture, a portion of said frame overhanging said table, telescoping means extending from said overhanging portion towards said table, an elongated guide track mounted on said telescopic means, a first mounting means having an elongated guide channel for receiving said guide track for slidable movement therealong, slot and bolt connection to said track for locking said first mounting means in adjustment, a second elongated guide channel on said mounting means at right angles to said first guide channel, both said elongated guide channels being parallel to said table, a second mounting means having a second guide track adjustably slidable in said second guide channel, second slot and bolt means for holding said second mounting means in adjustable position, an elongated guide for said band having one end secured to said second mounting means, said band passing through said table aperture, and a two-way adjustable means slidably receiving and mounting the other end of said band guide.

WILLIAM B. BOICE.

REFERENCES CITED

The following references are of record in the file of this patent:

UNITED STATES PATENTS

| Number | Name | Date |
| --- | --- | --- |
| 2,180,079 | Wilkie | Nov. 14, 1939 |
| 2,204,840 | Wilkie | June 18, 1940 |
| 2,261,816 | Williams | Nov. 4, 1941 |

FOREIGN PATENTS

| Number | Country | Date |
| --- | --- | --- |
| 541,823 | Great Britain | Dec. 12, 1941 |